US008881607B2

(12) United States Patent
Seymour

(10) Patent No.: US 8,881,607 B2
(45) Date of Patent: Nov. 11, 2014

(54) MINIATURE UNIVERSAL DYNAMOMETER EDUCATIONAL TOOL

(71) Applicant: Advins, Inc., Deerfield, IL (US)

(72) Inventor: Arthur Seymour, Deerfield, IL (US)

(73) Assignee: Advins, Inc., Deerfield, IL (US)

( * ) Notice: Subject to any disclaimer, the term of this patent is extended or adjusted under 35 U.S.C. 154(b) by 94 days.

(21) Appl. No.: 13/844,892

(22) Filed: Mar. 16, 2013

(65) Prior Publication Data

US 2014/0272916 A1    Sep. 18, 2014

Related U.S. Application Data

(60) Provisional application No. 61/616,482, filed on Mar. 28, 2012.

(51) Int. Cl.
*G01L 1/22* (2006.01)
*G09B 25/02* (2006.01)
(52) U.S. Cl.
CPC ..................................... *G09B 25/02* (2013.01)
USPC ........................................................ 73/862

(58) Field of Classification Search
USPC .................................. 73/862, 862.23, 862.31
See application file for complete search history.

(56) References Cited

U.S. PATENT DOCUMENTS

| 4,457,182 | A | * | 7/1984 | McFarland ................. | 73/862.18 |
| 4,466,294 | A | * | 8/1984 | Bennington et al. ....... | 73/862.13 |
| 4,669,318 | A | * | 6/1987 | Angstrom .................. | 73/862.09 |
| 4,848,142 | A | * | 7/1989 | Fujimori et al. ........... | 73/116.06 |

* cited by examiner

*Primary Examiner* — Jewel V Thompson
(74) *Attorney, Agent, or Firm* — Justin Lampel

(57) ABSTRACT

A miniature universal dynamometer for use in teaching and measuring horsepower of scaled down electronic vehicles and DC generators is provided. The miniature universal dynamometer relates generally to electro-mechanical vehicles that use DC energy and DC generators that produce electrical power. This miniature universal dynamometer relates specifically to vehicles that easily and quickly demonstrate to students and auto workers the design and horsepower used by the electronic vehicles in moving vehicles on various roadways. The device also utilizes a switch which allows the device to measure horsepower required to produce electrical power from a DC generator.

13 Claims, 8 Drawing Sheets

MINIATURE UNIVERSAL DYNAMOMETER EDUCATIONAL TOOL

CROSS REFERENCE TO RELATED APPLICATIONS

The present application is based on U.S. provisional application No. 61/616,482 filed on Mar. 28, 2012, currently co-pending, the entire contents of which are incorporated by reference. Applicant claims the priority benefit of the 61/616,482 application.

BACKGROUND OF THE INVENTION

Electric motor/generator dynamometers are a specialized type of adjustable-speed drive or roller used for measuring force, moment of force (torque), or power. For example, the power produced by an engine, motor or other rotating prime mover can be calculated by simultaneously measuring torque and rotational speed (RPM).

An absorption/driver roller may be driven by, for example, either an alternating current (AC) motor or a direct current (DC) motor. Either an AC motor or a DC motor may operate as a generator which drives the engine being tested. When equipped with appropriate control features, electric motor/generator dynamometers may be configured as universal dynamometers. More specifically, in engine testing, a universal dynamometer may not only absorb and measure the power of the engine, but it may also drive the engine for measuring friction, pumping losses and other factors.

The present device relates to a miniature dynamometer which may easily and quickly demonstrate to students, auto-builders and others the techniques used in measuring engine forces and horsepower. The present device is especially suitable for testing the force of a miniature car and then scaling the results to determine an approximate force for a full sized vehicle. The present dynamometer utilizes DC motors/generators on each end of a roller upon which car tires rotate to drive the roller. In an alternative embodiment, the universal dynamometer may be aided by the roller motor/generators to simulate up and down hill conditions. The motor/generator bearings of the device may also act as the roller bearings. The revolutions per minute (RPM) and circumference of the roller may then be used to, for example, calculate the actual miles per hour of a miniature car driving on the roller. The car is scaled down to match the miniature size of the present dynamometer. The miles per hour displayed on the meter may then be multiplied up to emulate actual miles per hour of a full-sized car.

The present universal dynamometer utilizes a beam of light sent to a receiving unit which in turn measures the light intensity of the beam and produces an electrical output proportional to the intensity of the light beam. A rotating roller of the device is designed to block or reflect the beam of light which, in turn, produces a pulse train which may be used to later calculate the RPM of the roller. More specifically, the rotating roller produces pulses at a frequency which is ultimately converted into an actual miles per hour of the miniature car.

A light-emitting diode (LED) is a semiconductor light source. LEDs are used as indicator lamps in many devices and are increasingly used for other lighting. Introduced as a practical electronic component in 1962, early LEDs emitted low-intensity red light, but modern versions are available across the visible, ultraviolet and infrared wavelengths, with very high brightness.

The present miniature universal dynamometer educational tool allows for a safe and fun teaching device for students and industrial engine designers. The device may be used to study engine design and horsepower without the dangers often associated with working with full-sized vehicles and dynamometers.

There are mechanical products to measure horsepower such as dyno systems which include bike dynes, rolling road dynes (auto, kart, motorcycle or truck), and sled track-dynos. However, these devices are used to measure actual full-sized vehicles. Some teaching aids currently being sold which emulate the complex interactions of forces in the real world by electric motors are large, expensive, and dangerous. Diagrams, videos and teaching aids are also available which explain horsepower measurements in a virtual environment, but these devices typically lack the physical interaction with real variables such as wind resistance, uphill, downhill, and battery drain. To completely understand the complexity of an electric engine powered vehicle, a teaching aid is required which emulates the mixing of road conditions and drain on engine power source. The present device utilizes hardware along with software (virtual) test equipment to allow a student to fully grasp real life engine principles. The students learn by acquiring measurements obtained in the present system and may alter the system to test for various elements, such as, unique environmental and road conditions.

Attempts have been made to produce an efficient universal dynamometer, as demonstrated in U.S. Pat. No. 6,247,357 to Yamamoto which provides for a "test apparatus in the form of dynamometers which is widely used for testing motor vehicles in place. Since the test vehicles are not moving over a road bed, the dynamometer must simulate certain forces normally associated with actual vehicle operation. These parameters include forces associated with inertia (related to the mass or weight of the vehicle) and road load forces (related to the velocity of the vehicle). The vehicle engine (or its braking system) must overcome inertial forces in order to accelerate or decelerate the vehicle. In addition, the engine must overcome breakaway frictional and rolling frictional forces (i.e., road/tire friction) as well as windage forces (i.e., drag forces caused by air passing over the vehicle). These latter forces are commonly referred to as road load (RL) forces and may be represented by a formula:"

Attempts have also been made to utilize a USB computer connection to determine force as provided by in U.S. Pat. No. 6,282,469 to Rogers which provides "a multi-point serial link protocol, such as USB, is used to transfer vehicle diagnostic information back and forth between vehicle diagnostic sensors and a host computer. Multiple distinct vehicle servicing applications may be added to or removed from the service bay without requiring substantial software changes or revisions. The amount of vehicle diagnostic hardware is also minimized. The multi-point serial link may originate in the vehicle's on-board computer, allowing the vehicle itself to function as a data hub for the diagnostic automotive service sensors."

Further, U.S. Pat. No. 6,457,351, also to Yamamoto, demonstrates the measuring of the force of electric motor vehicles wherein "a hybrid electric vehicle is placed in a running condition on a chassis dynamometer, a vehicle-end data is acquired by access to sensors in the vehicle, a dynamometer-end data is acquired by measurements at the chassis dynamometer, and the vehicle-end data and the dynamometer-end data are analyzed for inspections of drive and control systems of the vehicle.

These devices and patents fail to disclose a miniature dynamometer education tool and system which may easily, quickly and safely act as a teaching tool for students, auto-designers and others to learn and test simulated real world forces through the use of miniature or scaled down vehicles. Further, these devices and patents fail to disclose a device and system which has road load forces which may be used to test scaled-down vehicles and which may be used to demonstrate the workings of a fully electric miniature vehicle under various real world conditions.

SUMMARY OF THE INVENTION

A miniature universal dynamometer (MUD) educational tool and system for using the same is provided. The present MUD generally relates to an electro-mechanical systems with mechanical structures which produce electrical signals and switching systems similar to that of an actual full-sized car dynamometer used to measure engine characteristics and horsepower. This MUD relates specifically to structures that easily and quickly demonstrate to students and auto designers the loads and power sources used by an electric vehicle in travel through environmental conditions such as wind and uneven terrain. The device utilizes a beam of light sent through a rotating roller, which supports the driving wheels of a scaled down vehicle, to a receiving unit which produces a pulse train which is later converted to revolutions per minute and analyzed on a computer monitor to determine the speed of the vehicle.

A safe electro-mechanical system is provided which easily demonstrates the principles of power consumption in the miniature vehicle and emulates a real world fully electric vehicle. A computerized software system is also provided which demonstrates how to measure and maximize mileage from electric powered vehicles. This simulated system also allows for adding environmental conditions such as uneven terrain and wind resistance. Software in the system further allows the system hardware to make adjustments to keep speed and power levels accurate for measurements of horsepower. Test points are further included to allow for educational investigation.

There are many different ways to measure the horsepower of a vehicle. Gross horsepower is the measurement of engine output without the engine installed in a vehicle. Since the engine has no load on it, all of its energy can be used for making horsepower.

Wheel-driven horsepower, by comparison, is a measurement taken at the driven wheels of a vehicle on what's called a dynamometer. This is done by placing the vehicle's driven wheels on a large roller and accelerating the wheels up to a set condition. The vehicle's ability to turn this roller is measured and calculated to come up with a figure that represents how much horsepower is actually available to move the vehicle around—or real-world horsepower. Because a frictional loss between the engine and the driven wheels is unavoidable, wheel-driven horsepower will almost always be less than gross horsepower. One exception would be a steep and long downward slope that would add horsepower to the wheels.

The present device and system are especially suitable for giving an educator, student, or engineer a tool which not only closely emulates a real electric vehicle, but which does so in a safe manner designed to protect the user from harm and allows for investigation of the scaled down vehicle components. Different energy sources such as alkaline or lithium batteries may be added in this system to study maximum distance and power versus battery type. Actual working scaled down models of some real cars may even be used to further enhance the emulation.

Software of the system emulates a display panel which would be similar to a real display present on a full scale dynamometer. On this panel, the actual voltage and current being used by the electric motor is displayed. The actual revolutions per minute of the roller is displayed and used to calculate distance traveled. Actual miles per hour is calculated and displayed, then multiplied and displayed to emulate real world conditions for a full sized car. The horsepower is also calculated using a roller mass related to car weight and actual mph. A DC input is provided to allow external power sources to drive the car and not use batteries. By eliminating the use of disposable batteries, this invention also follows the principles required to reduce pollution.

An advantage of the present Miniature Universal Dynamometer (MUD) and system for using the same is that the present MUD provides a realistic simulator for an actual full-sized dynamometer which is used on vehicles which are sold to a final consumer.

Another advantage of the present Miniature Universal Dynamometer (MUD) and system is that the present MUD provides an economical way of teaching students and auto technicians how a typical electric vehicle works.

Yet another advantage of the present Miniature Universal Dynamometer (MUD) and system is that the MUD provides a safe way to test electric vehicles on a small scale.

Still another advantage of the present Miniature Universal Dynamometer (MUD) and system is that the present MUD provides a computer connection and software package to measure the horsepower and other performance factors of an electric vehicle which may then be compared to real world full-size vehicles.

And yet another advantage of the present Miniature Universal Dynamometer (MUD) and system is that the present device and system provide for a portable device which is easy for a student or auto designer to test and learn about electric vehicle systems.

For a more complete understanding of the above listed features and advantages of the smart miniature universal dynamometer (MUD), reference should be made to the following detailed description of the preferred embodiments and to the accompanying drawings. Further, additional features and advantages of the invention are described in, and will be apparent from, the detailed description of the preferred embodiments and from the drawings.

DETAILED DESCRIPTION OF THE PREFERRED EMBODIMENT

Figure 1:
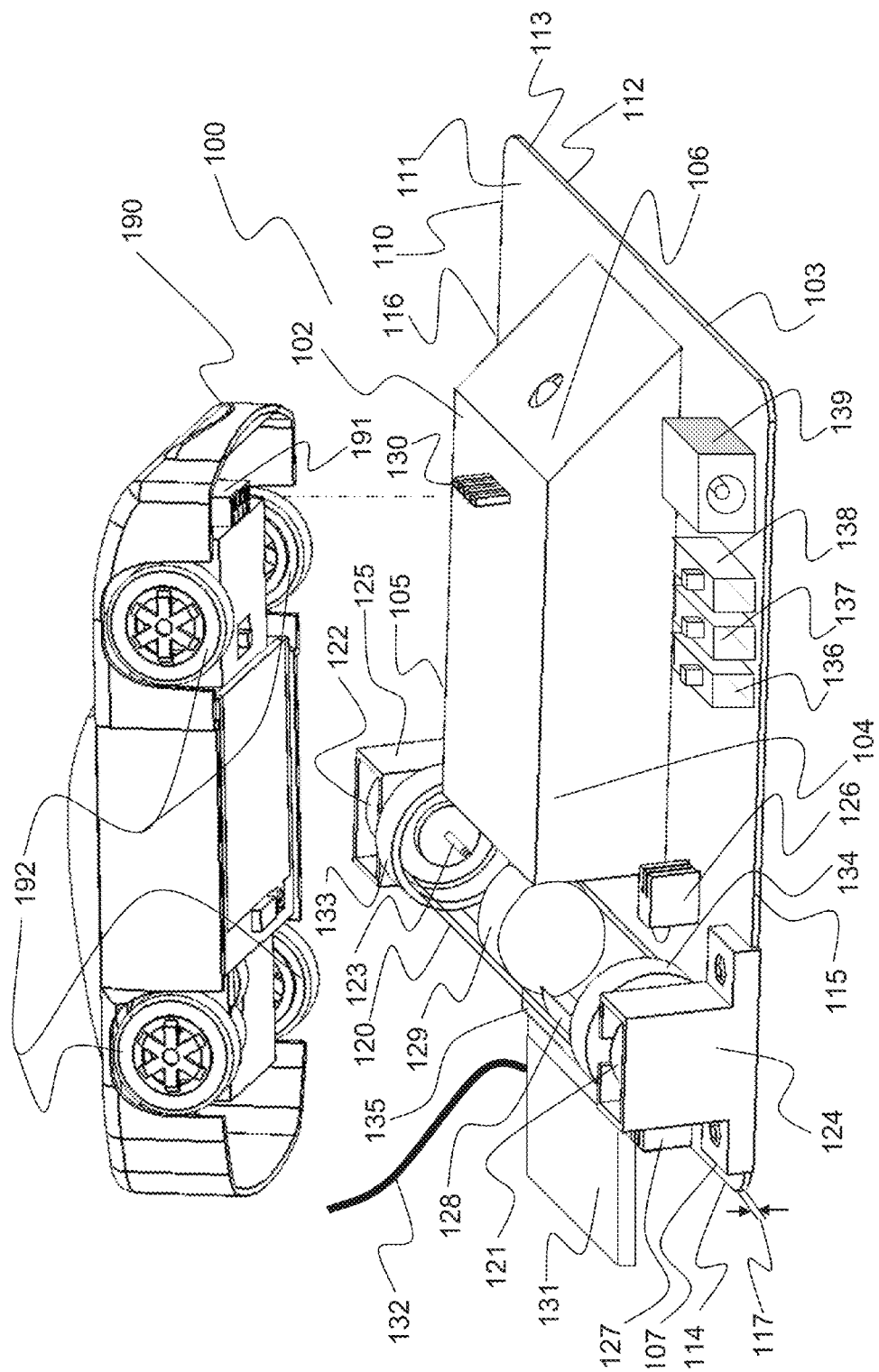
FIG. 1 illustrates a perspective view of the Miniature Universal Dynamometer wherein numerous electrical and non-electrical components are secured to the same and wherein a scaled down fully electrical vehicle is being inserted on the Miniature Universal Dynamometer.

The present device generally relates to a miniature universal dynamometer for use in connection with electro-mechanical cars with fully electrical engines. The present device may be used to determine the approximate force of scaled-up full-size all electrical automobiles. The present miniature universal dynamometer allows for easy and quick demonstrations for students and automobile engineers and designers of the architecture and power requirements used by fully electrically powered vehicles. The device utilizes a generally transparent spinning roller which is driven by the tested vehicle and a light source aimed at a receiving unit wherein the light source is sent through the generally transparent spinning roller. When the light source is interrupted by an opaque area on the generally transparent spinning roller while traveling to a receiving unit, the light source produces a square wave which is later converted to revolutions per minute (rpm) which may then be used to calculate the distance the wheels of the vehicle have transversed in a given time period (mph) and ultimately the work done by the vehicle or horsepower at the wheels to turn the roller.

The present miniature universal dynamometer uses a scaled down vehicle in both size and weight. The scaling factor for size is the ratio of the vehicle wheel diameter on the miniature model to the real world vehicle wheel size that the model emulates. This ratio is used to compare actual miles per hour to a scaled up miles per hour in the real world and a factor of twenty-eight (28) was therein used in this system. Miles per hour is defined as the ratio of the distance traveled (in miles) to the time spent traveling (in hours). The scaling factor for weight is also required when comparing the miniature vehicle horsepower to the horsepower of a real world vehicle being emulated. This ratio can be calculated by using the weight of the miniature vehicle, approximately 185 grams with batteries, and the weight of the, for example, Chevy Volt (3520 lbs) electric car which equals a ratio of approximately 8,650:1.

An inertial test consists of accelerating an engine which has been connected to an inertial wheel or roller in the range of revolutions to be studied. The quality of the results depends mainly on the inertia of the roller. As the engine accelerates, it consumes part of the energy which is available to provide accelerating its own rolling elements (gears, toothed wheel, wheels, and bearings) which also have their own inertia. It is desired that the inertia of the roller be greater then equivalent inertia of the rolling parts of the vehicle. Another desired condition is that the inertia of the roller may be controled by a DC motor breaking force. In this miniature universal dynamometer, the power is trasmitted to the inertial mass of the roller by traction of the tire on the same roller. Using the above conditions a calculation of vehicle power at the wheels of the vehicle can be expressed as:

$$P = W/(t_2 - t_1) \text{ where;}$$

P=power in Watts
W=work done in time period $(t_2-t_1)$ in joules
$t_1$=start time
$t_2$=stop time $$W = W_1(\text{inertia of roller}) + W_2(\text{drag due to roller motors})$$

$$W_1 = \tfrac{1}{2} I \omega_2^2 - \tfrac{1}{2} I \omega_1^2 \text{ where;}$$

$W_1$=work done in time period $(t_2-t_1)$ in joules
I=roller inertia in kg·m²
$\omega_1$=speed of roller at time 1 in rad/sec
$\omega_2$=speed of roller at time 2 in rad/sec $$W_2 = (E_{avg} \times I_{avg}) \times (t_2 - t_1) \text{ in joules.}$$

$E_{avg}$=Average voltage on roller moters during time $t_2-t_1$
$I_{avg}$=Average current to roller moters during time $t_2-t_1$ Referring now to FIG. 1, the miniature universal dynamometer 100 may have a top 102, a bottom 103, a first side 104, a second side 105, a front 106 and a back 107. In an embodiment, the miniature universal dynamometer 100 may be generally the size of, for example, a notebook computer. The miniature universal dynamometer of the present application is generally illustrated in a rectangular manner in the drawings; however, the miniature universal dynamometer 100 may take any suitable shape capable of supporting a scaled down vehicle 190.

The miniature universal dynamometer 100 may have a circuit board 110 which forms a main base portion. The circuit board 110 may have a top 111, a bottom 112, a first side 115, a second side 116, a front 113 and a back 114. The circuit board 110 of the present miniature universal dynamometer 100 may be largely planar and may have a height 117. Further, the circuit board 110 may be strong enough so as to support numerous components (as discussed below) which may be secured and/or may rest on the top 111 of the circuit board 110. In addition, the circuit board 110 of the miniature universal dynamometer 100 may have electrically conductive and electrically non-conductive components (as discussed below).

Mounted on the top 111 of the circuit board 110 of the miniature universal dynamometer 100 may be a generally transparent spinning roller 120 (or "inertial roller") which rotates along a center rotational axis. The generally transparent spinning roller 120 may be rotated by, for example, two permanent magnet DC motors/generators 121, 122 which, in turn, rotate two drive shafts 123, 305 which are located on each end of the generally transparent spinning roller 120. The permanent magnet DC motors/generators 121, 122 may be mounted and attached to circuit board 110 by, for example, two motor mounting brackets 124, 125 located on opposite ends of the generally transparent spinning roller 120.

An LED 126 may be secured to the top 111 of the circuit board 110 of the device 1. The LED 126 may be aimed at the generally transparent spinning roller 120 so that light which exits the LED 126 moves toward the generally transparent spinning roller 120. In an embodiment, the generally transparent spinning roller 120 is substantially transparent so as to allow light radiated from the LED 126 to pass through the transparent portions of the spinning roller 120 wherein the light is then detected on the other side of the generally transparent spinning roller 120 by a photo transistor 127 which is also secured to the top 111 of the circuit board 120. More specifically, the generally transparent spinning roller 120 may be located between the LED 126 and the photo transistor 127 such that light from the LED 126 cannot reach the photo transistor 127 without passing through the generally transparent spinning roller 120.

An opaque piece of material 128 may be mounted on or in the generally transparent spinning roller 120. The opaque piece of material 128 may be generally rectangular in shape and may block the light from LED 126 from reaching the photo-transistor 127 twice per revolution. In an embodiment, the generally transparent spinning roller 120 may be hollow and capable of holding a balanced mass 129, to increase the moment of inertia of the generally transparent spinning roller 120.

The device 100 may utilize a fully electronic miniature vehicle 190 having a female plug 191 which securely mates with a male plug 130 on the miniature universal dynamometer 100. The fully electronic miniature vehicle 190 may have front and rear wheels 192, wherein the real wheels 192 rest at top dead center of generally transparent spinning roller 120. The connection of the female plug 191 and male plug 130 may create an electrical communication between the miniature vehicle 190 and the miniature universal dynamometer 100 which in turn allows a user to control and measure electrical parameters of the miniature vehicle 190. Data obtained from running the miniature vehicle 190 on the generally transparent spinning roller 120 may then be transferred through an interface device 131 and cable 132 to a computer with appropriate software to display the data.

Figure 2:
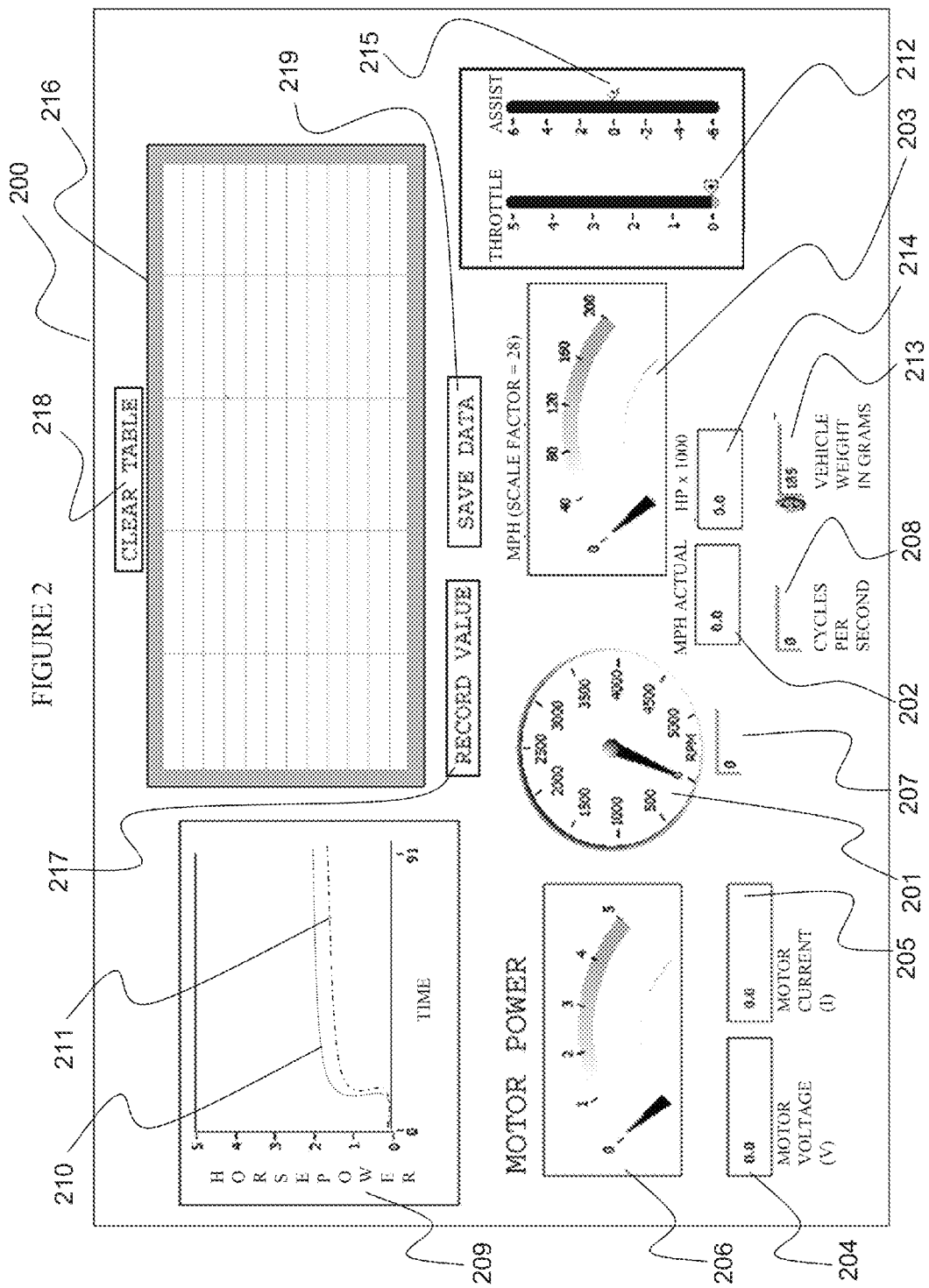
FIG. 2 illustrates a view of a computer screen with a display showing: voltage at the engine, current used by engine, acceleration control, a graph of engine horsepower versus horsepower at the wheels, roller revolutions per minute, roller assist control, vehicle speed, vehicle weight, actual vehicle miles per hour and miles per hour for scaled up vehicle.

Referring now to FIG. 2, the data gathered by the miniature universal dynamometer 100 may be displayed on a computer screen 200 using an RPM (Revolutions per Minute) pointer meter 201 with digital readout 207, actual miles per hour digital display 202, scaled up to full vehicle size miles per hour being emulated on a miles per hour pointer display 203, digital display of voltage at engine 204, digital display of current being used by engine 205, a pointer display of electrical motor power 206, frequency in cycles per second of inertial roller 208, and a graph of Horsepower 209 for both engine 210 and at wheels 211. A throttle control 212 to adjust the voltage on the vehicle's 190 electronic engine is also displayed on the computer display 200. An input box 213 for the weight of the vehicle 190 is available and data entered into said input box 213 is used to calculate the wheel horsepower 211 displayed on the graph 209. A digital display 214 of the milli-horsepower at the wheels is also provided. Horsepower data can be recorded in the Table 216 display be clicking the Record Button 217. Table 216 data can be cleared by clicking the Clear Table button 218 or stored in a computer file by clicking the Save button 219. A roller control 215 is also provided which drives motors 121, 122 and can be used to emulate down hill or up hill conditions.

Figure 3:
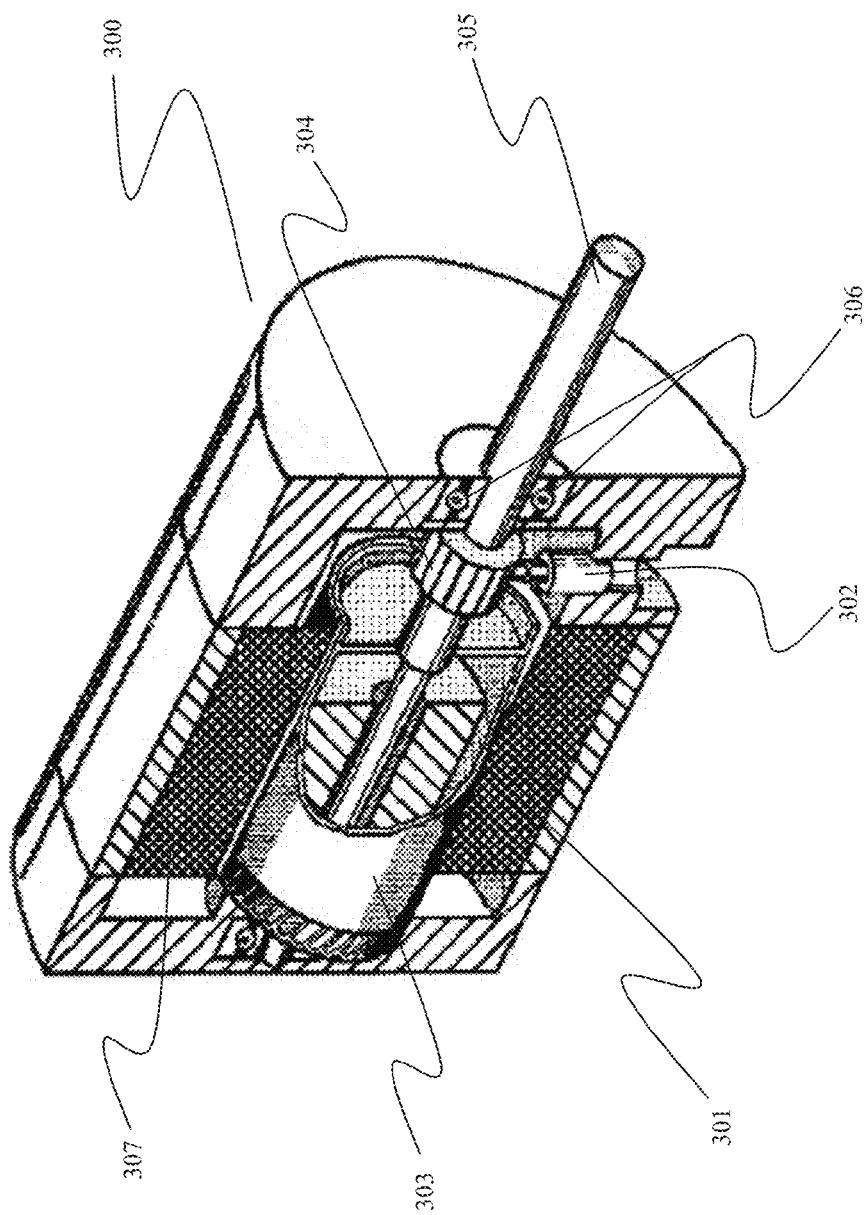
FIG. 3 Shows a cutaway view of a permanent-magnet DC electrical motor/generator.
Figure 4:
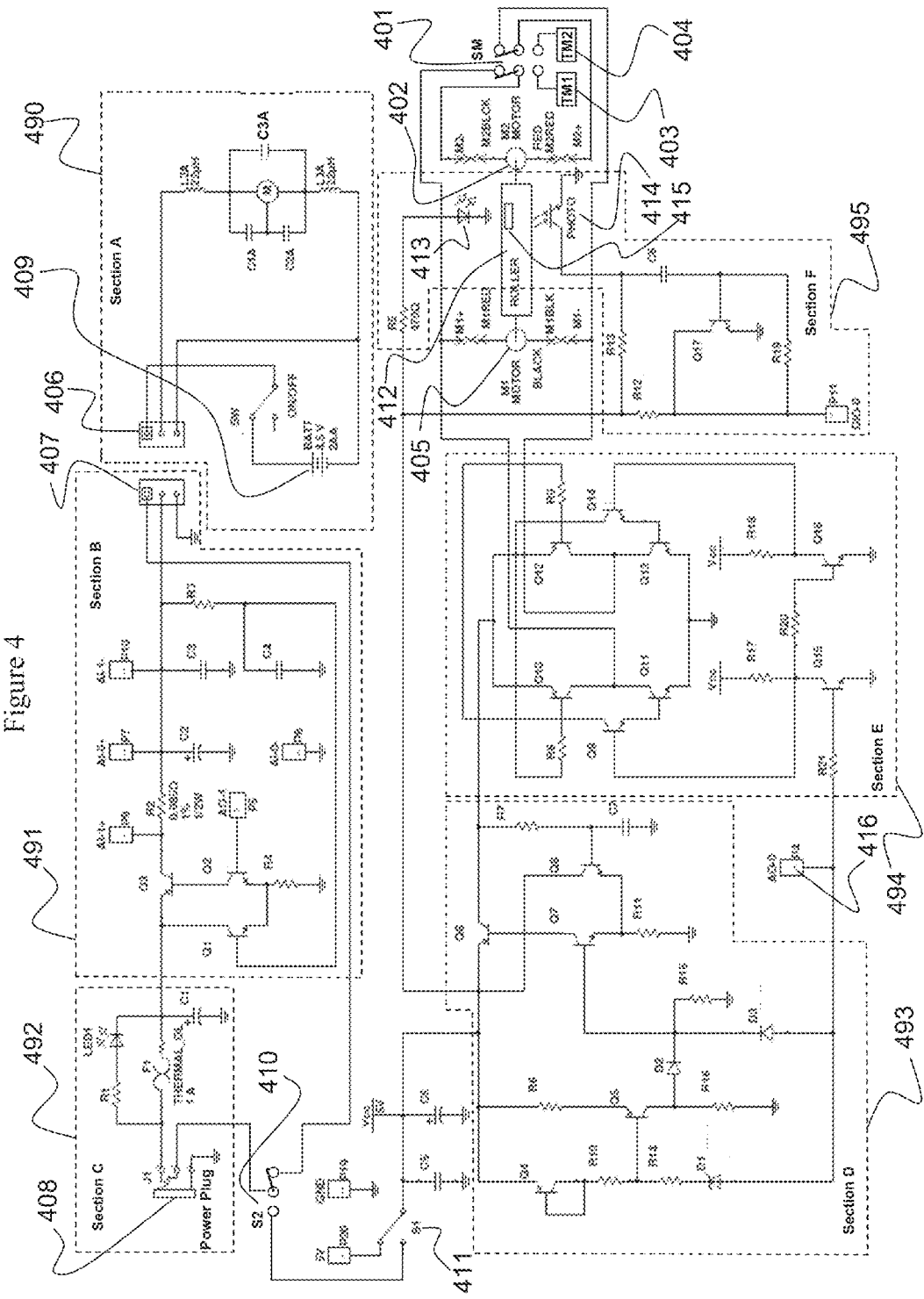
FIG. 4 illustrates a schematic of the wiring of the Miniature Universal Dynamometer simulator and scaled down vehicle.

FIG. 3 shows a sectional view of the DC motors 300, 121, 122 which support the generally transparent spinning roller 120 on each end by pressure fitting the motor shaft 305, 123 through roller end caps 133, 134 along the spinning roller's 120 rotation axis. Said motor shaft 305 is supported by ball-bearings 306 which provide minimum friction at maximum support. The DC motor 300 uses brushes 302, permanent magnets 301, 307, a winding 303 and a commutator 304 which allows the motor 300 to generate a DC voltage when rotated by an external force. Switch SM 401, 138 is a double pole double throw switch in FIG. 4 showing the two motors 121, 122 in parallel to drive the generally transparent spinning roller 120. Flipping switch SM 401, 138 will break the parallel connection and place the leads from motor M2 402 on test points TM1 403 and TM2 404. In this case the motor M2 402, 122 is driven by motor M1 405, 121 and connecting roller 120. The present device may be used in association with software as a universal dynamometer as a result of being able to be used as both an absorption dynamometer with a switch SM 401, 138 as shown in FIG. 4 or as a driven dynamometer when switch SM 401, 138 is flipped.

Referring to FIG. 4 a schematic view for the electronic vehicle 190, is shown in Section A 490. Power to the electronic vehicle 190 may be controlled and supplied through the female connector 406, 191 which mates with the corresponding male connector 407, 130. Section B 491 may be used to control and measure the engine power of the electronic vehicle 190. Section C 492 of FIG. 4 is a schematic showing how Power Plug 408, 139 may provide external power to the device or how the battery 409 located in the electronic vehicle 190, 409 may be used when switch S2 410, 137 is in position shown.

If S2 410 and S1 411 are in the opposite position as shown in FIG. 4, then external power at plug J1 408, 139 will be sent to power roller motors 121, 405, 122, 402 and associated circuits shown in Section D 493, Section E 494, and Section F 495. When switch S1 411, 136 is in position shown in FIG. 4, power for roller motors 121, 405, 122, 402 and associated circuits shown in Section D 493, Section E 494, and Section F 495 will come from USB cable 132 and interface module 131. In this embodiment, the RPM of the generally transparent spinning roller 120, 412 may be measured by transmitting light from an LED 413, 126 through the generally transparent spinning roller 120, 412 and sensing the light on the other side of the spinning roller 120, 412 with the photo-transistor 414, 127. As mentioned above, an opaque piece of material 128 (such as an opaque tape) 415, 128 may be placed inside the generally transparent spinning roller 120, 412 so as to block the light twice per revolution. In this manner the associated circuitry in Section F 495 produces a train of pulses that can be used to calculate the RPM of the generally transparent spinning roller 120, 412.

In an embodiment, the opaque piece of material 128 may also be made from a reflective material and may be placed on the outside of a non-transparent spinning roller reflecting the transmitted light from LED 413, 126 once each revolution to a photo-transistor 414, 127 placed on the same side as the LED 120, 412. Section E 494 circuitry uses the voltage at P4 to control the direction of rotation of roller 120, 412. Section D 493 circuitry uses the voltage at P4 to control the speed of roller 120, 412.

Figure 5:
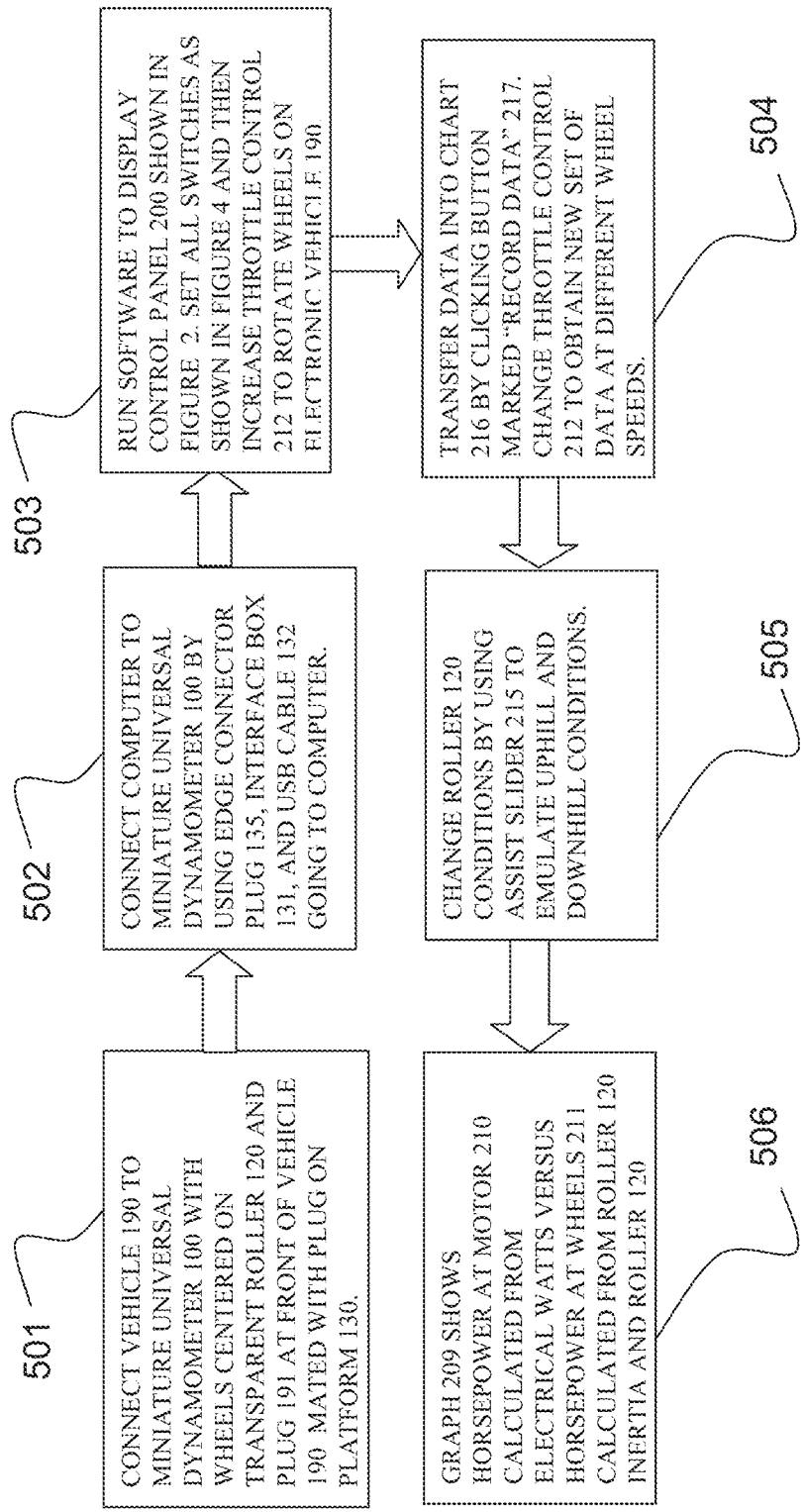
FIG. 5 illustrates a block diagram for using the Miniature Universal Dynamometer in the absorption mode to measure horsepower at the motor of an electronic vehicle and horsepower at the wheels of that vehicle.

FIG. 5 shows the steps necessary to use the miniature universal dynamometer 100 in the absorption mode to measure the power coming from a scaled down electronic vehicle 190. The first block 501 describes how to mount the electronic vehicle 190 to the dynamometer 100. The next block 502 describes connection of the dynamometer 100 to a computer. Block three 503 gives instructions on switch setup and the control process to turn on the electronic vehicle 190 from the computer. Block four 504 describes how to record data to a file on the computer. Block five 505 describes how open road conditions, such as uphill or downhill, can be emulated using the computer. The final block 506 describes the horsepower data being displayed in a graph on the computer screen.

Figure 6:
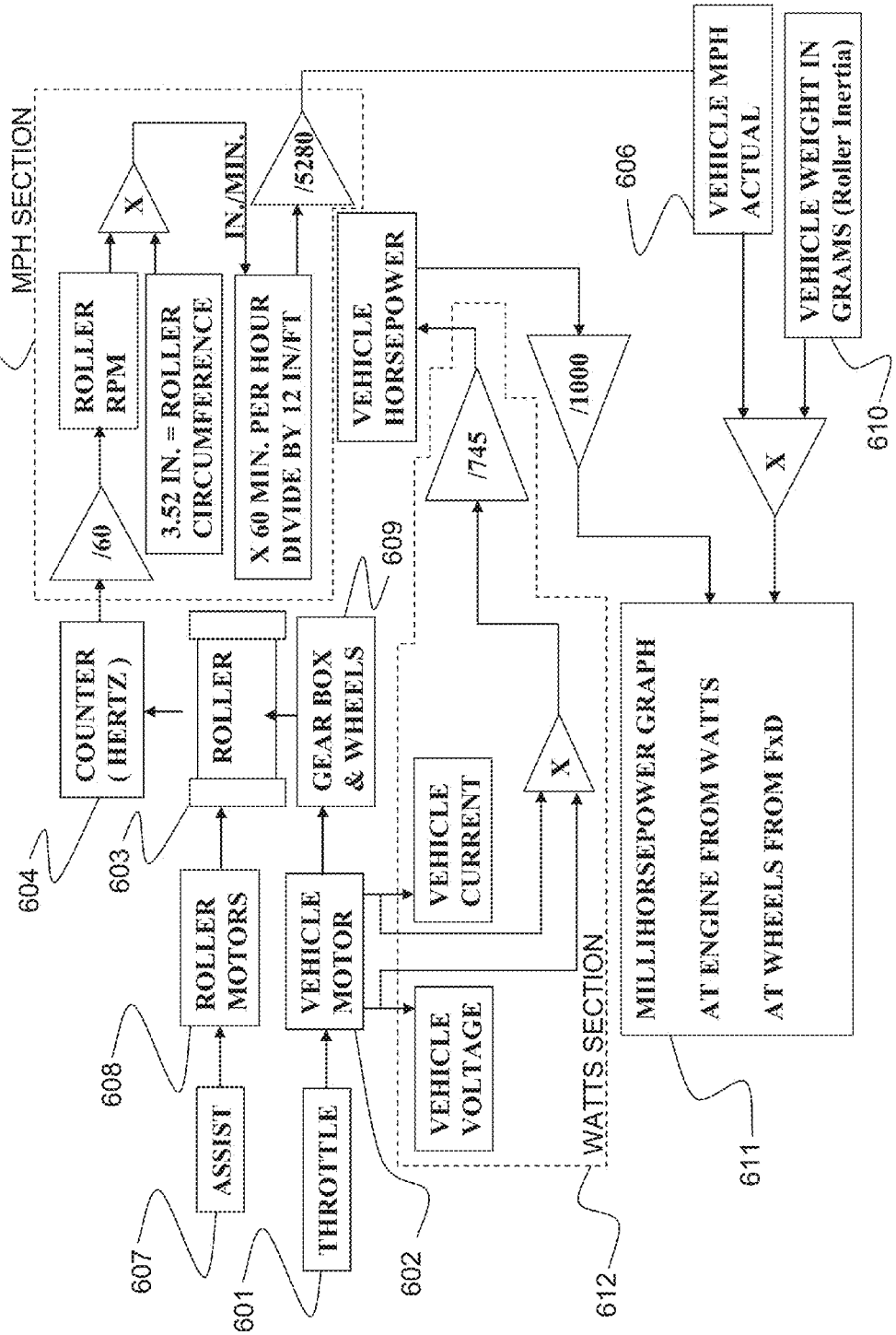
FIG. 6 illustrates a flow chart of the system used to measure and compare engine horsepower with load by using voltage and current at the electronic vehicle engine under load, versus vehicle horsepower using force through distance method of calculation at the wheels of the electronic vehicle.

The flow chart in FIG. 6 shows the computer software procedure used to calculate the electronic vehicle 190 horsepower. When the throttle 601, 212 is increased the vehicle 190 motor 602 voltage is increased. The motor 602 turns the gear box and wheels 609 which in turn drives the roller 120, 412, 603. A counter 604 is used to read the cycle per second of the roller 120, 412, 603 and this information is passed to the MPH section 605 which calculates the actual MPH 606, 202 of the vehicle 190. The measured MPH 606, 202 is multiplied by the weight of the vehicle 610, 213 to get the horsepower at the wheels of the vehicle 214 and display it in a graph 611, 211. When the inertia of the roller 120, 412, 603 is equal to the weight of the vehicle 190, 213, 610 the horsepower calculated from force times distance will be accurate. The horsepower at the vehicle 190 motor is calculated in the Watts Section 612 of the program and divided by 1000 to get milli-horsepower. This number is then sent to the graph 611, 209 and displayed as engine horsepower 210.

Figure 7:
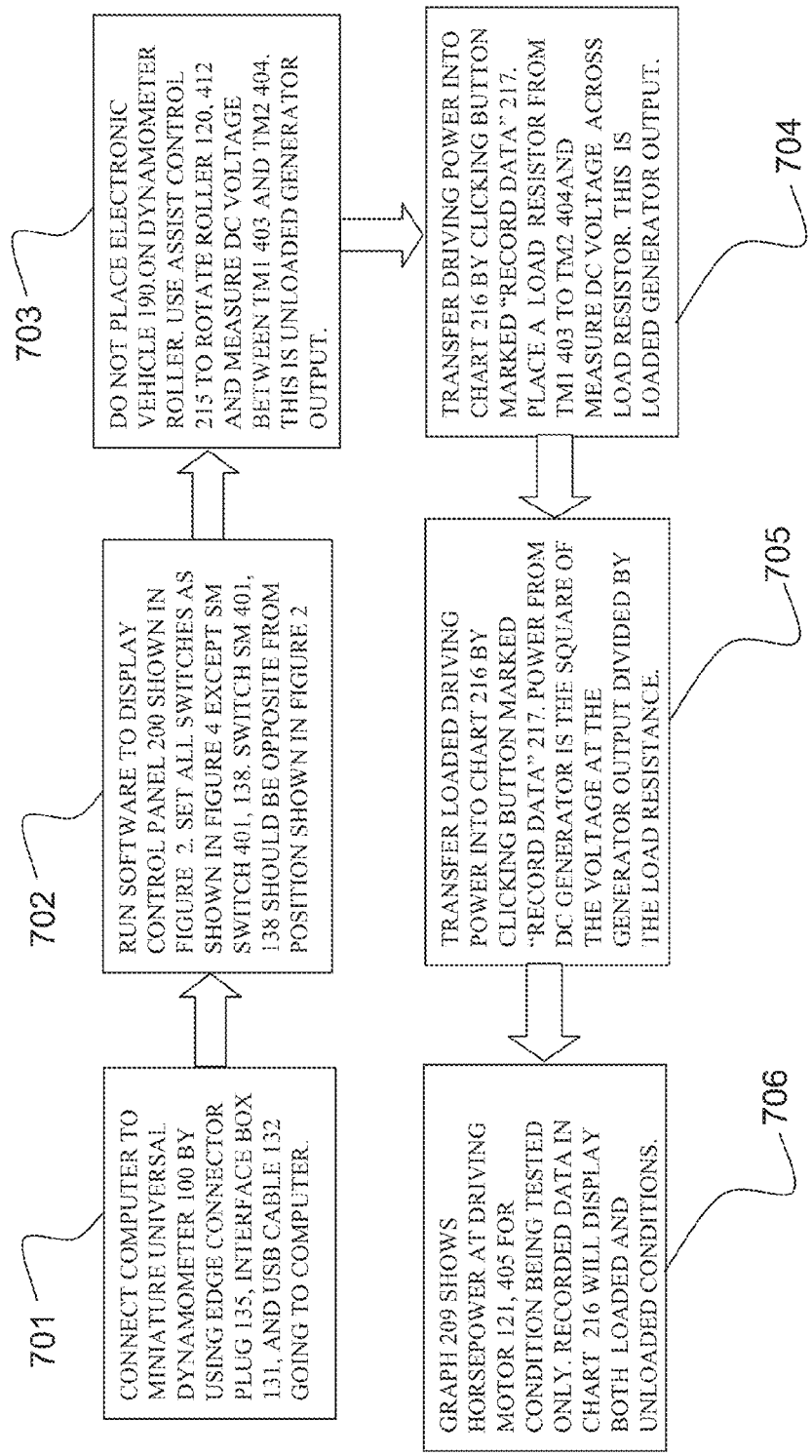
FIG. 7 illustrates a block diagram for using the Miniature Universal Dynamometer in the driving mode to measure horsepower required to drive a DC generator unloaded and loaded.

FIG. 7 shows the steps necessary to use the miniature universal dynamometer 100 in the driving mode to measure the power needed to drive a DC generator. The first block 701 describes connection of the dynamometer 100 to a computer. The next block 702 gives instructions on switch setup. Switch SM 401, 138 converts motor M2 402, 122 into a DC generator by transferring motor leads for this motor to test pins TM1 403 and TM2 404. Block three 703 describes how to drive the DC generator M2 402, 122 and record the unloaded voltage at M2 402, 122 output leads. Block 4 704 describes storing data in chart 216 and loading the generator 402, 122 for next reading. Block five 705 describes how to calculate power at the load and store data in a file. The final block describes what is graphed on the computer graph display 209.

Figure 8:
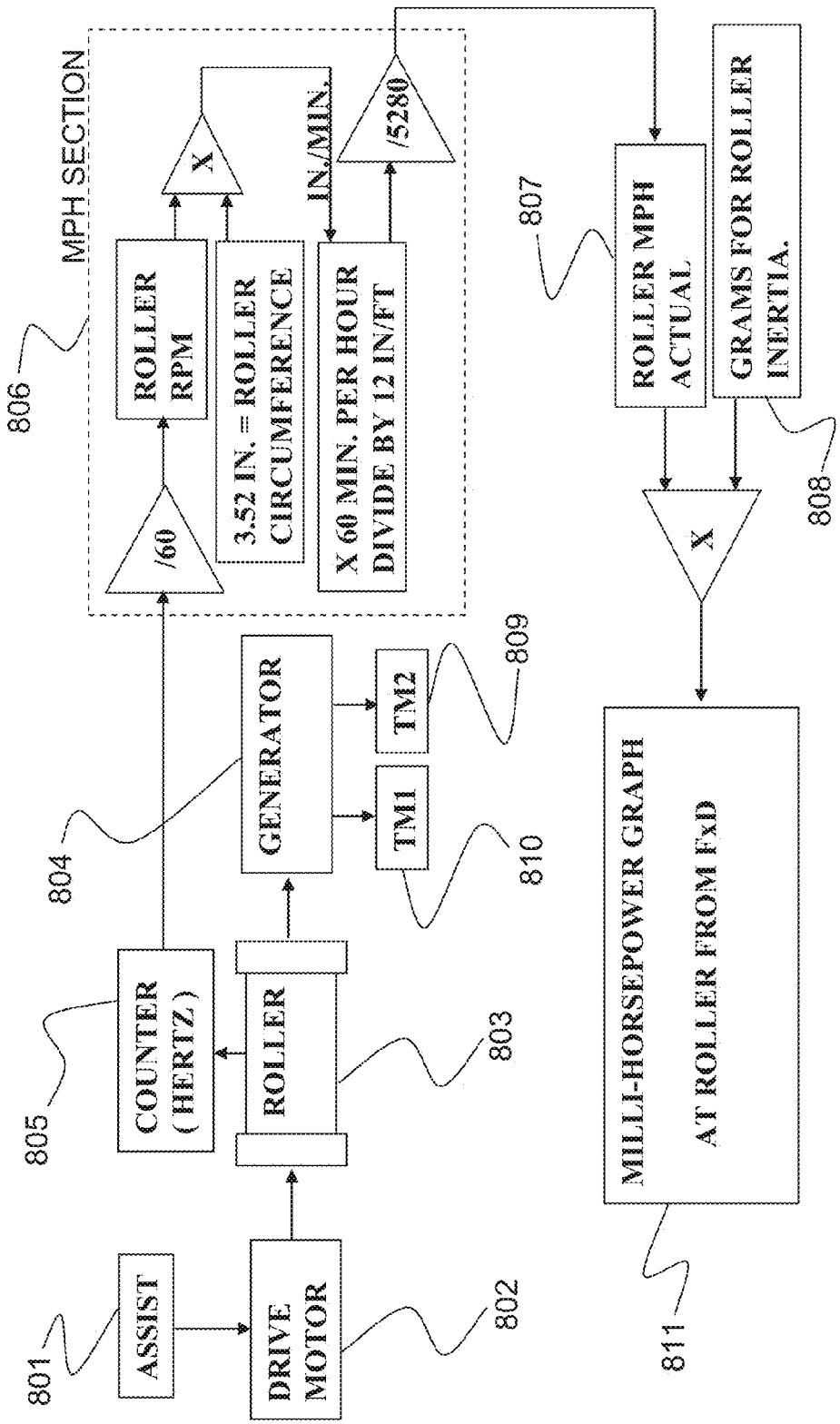
FIG. 8 illustrates a flow chart of the system used to measure and compare power required to drive a DC generator with and without a load.

The flow chart in FIG. 8 shows the computer software procedure used to calculate generator efficiency. When the assist 801, 215 is increased the M1 motor 802, 121, 405 voltage is increased and turns the roller 803, 120, 412 which in turn drives the generator 804, 402, 122. A counter 805 is used to read the cycle per second of the roller 120, 412, 803 and this information is passed to the MPH section 806 which calculates the actual speed in MPH 807, 202 of the roller 120, 412, 803. The speed 807 and inertia of the roller 808 is multiplied to get the horsepower at the generator shaft 123 and display on a graph 811, 211. When the generator 804 is placed under load by placing a resistor from TM1 810 to TM2 809 speed of the roller 120, 412, 803 will drop as horsepower is transferred to the load. The difference in power should be the power delivered to the load and can be verified by squaring the voltage on the load and dividing by the load resistance value. Again the watts produced by the generator should be slightly less than the power calculated from force times distance.

Although embodiments of the miniature universal dynamometer for use in teaching and measuring horsepower of scaled down electronic vehicles and DC generators are shown and described therein, it should be understood that various changes and modifications to the presently preferred embodiments will be apparent to those skilled in the art. Such changes and modifications may be made without departing from the spirit and scope of the device for increasing its educational value without diminishing its attendant advantages. It is, therefore, intended that such changes and modifications be covered by the forthcoming claims.

The invention claimed is:

1. A miniature dynamometer comprising:
a base having a top and a bottom;
a securing mechanism having a top and a bottom wherein the bottom of the securing mechanism is secured to the top of the base and wherein the top of the securing mechanism is capable of supporting and securing a miniature vehicle having a mass and having rotating wheels and an engine;
a generally cylindrical rotating apparatus having a first end, a second end and a mass wherein the generally cylindrical rotating apparatus is secured on each end by a separate shaft wherein each shaft is connected to a support motor and wherein each support motor is secured to a brace which is secured to the top of the base and wherein the wheels of the miniature vehicle contact and move in unison with the generally cylindrical rotating apparatus and wherein the energy required to accelerate the mass of the cylindrical rotating apparatus at an angular velocity is approximately the same as the energy required to accelerate the mass of the vehicle on a flat level surface at a linear velocity;
a computer circuit having a power source wherein the computer circuit is electrically connected to and capable of measuring revolutions of said generally cylindrical rotating apparatus to determine angular acceleration produced by said wheels of the miniature vehicle driving the cylindrical rotating apparatus;
wherein the miniature vehicle is supported by the securing mechanism in a position so as to force the rotating wheels of the miniature vehicle to engage the generally cylindrical rotating apparatus;
a power source electrically connected to the engine of the miniature vehicle or the shaft of the support motors of the generally cylindrical rotating apparatus wherein the power source powers the miniature vehicle or the support motors of the generally cylindrical rotating apparatus; and
wherein the computer circuit controls and measures the electrical power to the engine of the miniature vehicle and the support motors of the generally cylindrical rotating apparatus while the wheels of the miniature vehicle are rotating on the generally cylindrical rotating apparatus and wherein the computer circuit determines and measures the power required to drive the generally cylindrical rotating apparatus and supporting motor shafts.

2. The dynamometer of claim 1 wherein the miniature vehicle is an electric vehicle.

3. The dynamometer of claim 1 wherein the computer circuit controls the driving of the support motors to assist or impede the turning of the generally cylindrical rotating apparatus by the wheels of the miniature vehicle.

4. The dynamometer of claim 1 further comprising:
an electrical cable connecting the computer circuit to a software program which calculates the horsepower of the miniature vehicle.

5. The dynamometer of claim 4 wherein the horsepower created from the rotation of the generally cylindrical rotating apparatus substantially equals the horsepower generated by the engine of the miniature vehicle when driven on a flat surface.

6. The dynamometer of claim 1 further comprising:
a computer monitor electrically connected to the computer circuit wherein the computer monitor displays and graphs the actual speed of the miniature vehicle and the conditions required to achieve that speed.

7. The dynamometer of claim 1 further comprising:
an external power source used to power the miniature vehicle.

8. The dynamometer of claim 7 further comprising:
a computing device electrically attached to the external power source wherein the computing device monitors and records the efficiency by the miniature vehicle in achieving a predetermined set horsepower.

9. The dynamometer of claim 1 wherein at least a portion of the generally cylindrical rotating apparatus is transparent.

10. The dynamometer of claim 9 wherein a portion of the generally cylindrical rotating apparatus is substantially transparent except for a generally rectangular opaque surface on an external perimeter of the transparent portion of the generally cylindrical rotating apparatus wherein the generally rectangular opaque surface periodically prevents a beam of light from passing through the generally cylindrical rotating apparatus and exiting the generally cylindrical rotating apparatus.

11. The dynamometer of claim 1 wherein the generally cylindrical rotating apparatus has a diameter of approximately one inch and a mass equal to approximately three times the mass of the miniature vehicle so as to allow similar acceleration and coasting for both the cylindrical rotating apparatus and the miniature vehicle on a level surface.

12. The dynamometer of claim 3 further comprising:
an electrical circuit connected to a software program and wherein the electrical circuit is electrically connected to the support motors wherein the software program calculates the electrical power being used to drive the support motors and further wherein the software program calculates the power coming from the support motors under various conditions to measure power added or removed when emulating uphill or downhill conditions.

13. A miniature dynamometer comprising:
a base having a top and a bottom;
a generally cylindrical rotating apparatus having a first end, a second end and a mass wherein the generally cylindrical rotating apparatus is secured on each end by a separate shaft wherein one shaft is connected to a support motor which supplies power to drive the generally cylindrical rotating apparatus and wherein the other shaft is attached to a generator and wherein the shaft of the support motor and the shaft of the generator are secured to braces which are secured to the top of the base;
a power source connected to the support motor;
a computer circuit connected to the power source wherein the computer circuit is electrically connected to and capable of measuring the power used by the support motor of the generally cylindrical rotating apparatus wherein the power source powers the support motor of the generally cylindrical rotating apparatus;
wherein the computer circuit controls and measures the electrical power to the support motor of the generally cylindrical rotating apparatus and the generator of the generally cylindrical rotating apparatus; and
wherein the computer circuit calculates the efficiency of the generator when driven by a DC motor.

* * * * *